United States Patent [19]

Maeda et al.

[11] Patent Number: 4,702,517
[45] Date of Patent: Oct. 27, 1987

[54] DETACHABLE-TYPE VEHICLE SUN SHADE

[75] Inventors: Yoshihiko Maeda; Toshiaki Nogami; Shigeru Kashiwagi, all of Kariya; Kenji Sakurai, Toyota; Kunio Nishiyama, Okazaki, all of Japan

[73] Assignees: Toyota Shatai Kabushiki Kaisha, Kariya; Toyota Jidosha Kabushiki Kaisha, Banchi, both of Japan

[21] Appl. No.: 888,207

[22] Filed: Jul. 23, 1986

[30] Foreign Application Priority Data

Jul. 31, 1985 [JP] Japan ............... 60-117548[U]

[51] Int. Cl.⁴ ............. B60J 7/11; B60J 7/19; B60J 7/195
[52] U.S. Cl. .................... 296/214; 296/216; 296/218; 296/224; 292/204; 49/61; 49/465
[58] Field of Search ........... 296/214, 216, 218, 224; 292/202 (U.S. only), 204, 241; 24/289, 292; 49/61, 465

[56] References Cited

U.S. PATENT DOCUMENTS

| | | | |
|---|---|---|---|
| 978,585 | 12/1910 | Huber | 292/202 |
| 1,844,262 | 2/1932 | Pierson | 292/241 X |
| 2,178,363 | 10/1939 | Schatzman | 292/204 |
| 4,104,825 | 8/1978 | Hosmer | 296/218 X |

Primary Examiner—Dennis H. Pedder
Attorney, Agent, or Firm—Burns, Doane, Swecker & Mathis

[57] ABSTRACT

A detachable-type vehicle sun shade apparatus is disclosed for use in vehicles having glass sun roofs installed between a center roof material and an exterior panel, both of which define an opening. The opening has a flange mounted trim strip therearound and a holder is mounted along a first edge of the opening. A sun shade has a first edge receivable between the holder and the trim strip. A stopper is rotatably mounted on the sun shade adjacent the second edge of the sun shade, with the stopper including edge engaging structure for engaging the trim strip along a second edge of the opening which is adjacent the second edge of the sun shade. A knob is provided for rotating the stopper and bringing the edge engaging structure into engagement with the trim strip along the second edge of the opening. The second edge of the sun shade is pressed against the trim strip along the second edge of the opening when the stopper is rotated to a position where the edge engaging structure engages the trim strip along the second edge of the opening.

4 Claims, 6 Drawing Figures

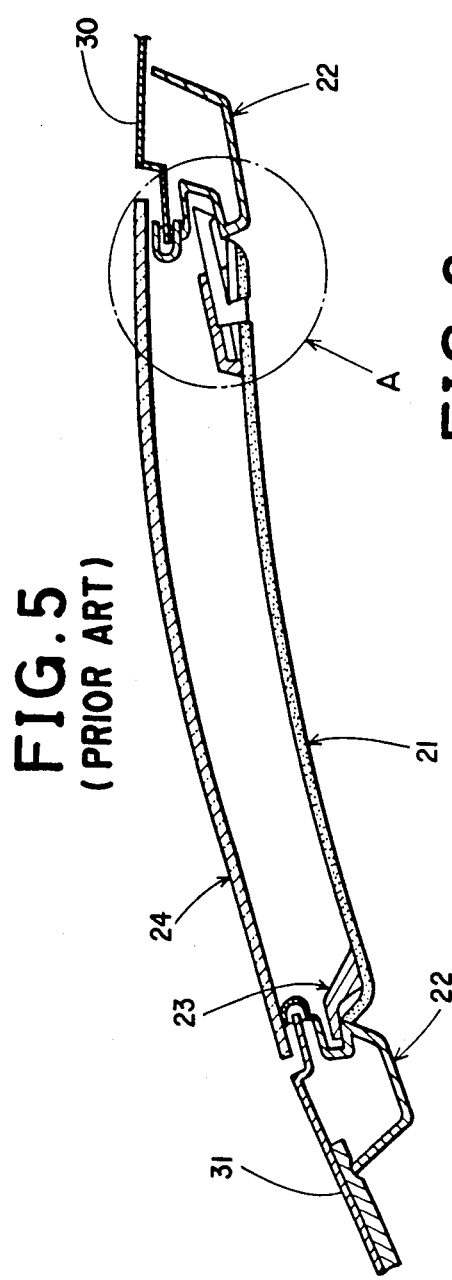
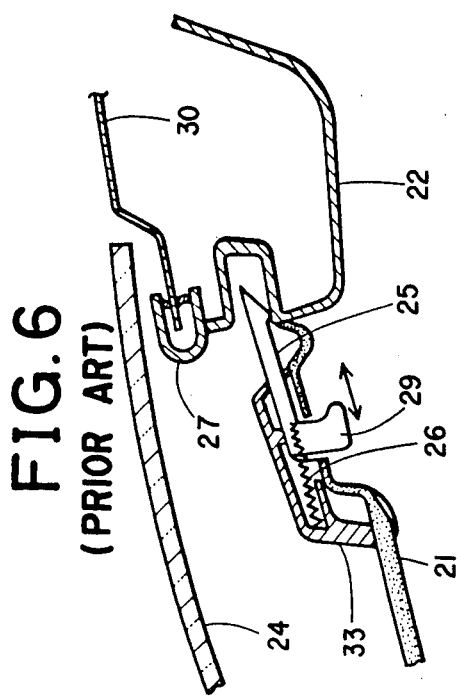
FIG. 5 (PRIOR ART)
FIG. 6 (PRIOR ART)

4,702,517

DETACHABLE-TYPE VEHICLE SUN SHADE

BACKGROUND OF THE INVENTION

This invention relates to a detachable-type vehicle sun shade for use with van-type or other motor vehicles wherein a glass sun roof is installed extending from the center materials of the roof to the exterior panel, and particularly relates to the mounted structure of such a sun shade.

DESCRIPTION OF THE PRIOR ART

Conventionally, as described in FIGS. 5 and 6, in existing vantype vehicles ornamentation trim 22 is attached between sun shade 21 and the center roof material 30 of the vehicle roof because sun shade 21 is nondetachable from the vehicle body. Ornamentation trim 22 is also attached between said sun shade 21 and vehicle exterior panel 31. Stopper 23 is attached at the bottom edge of sunshade 21, while housing 33 is attached at the top edge of sunshade 21. Top stopper 25, which is moveable via knob 29, is inserted into housing 33 by snapping off compression spring 26. Thereupon, the mounting of sun shade 21 to glass sun roof 24 is accomplished when the bottom edge of shade 21 is pushed upward so as to connect with a portion of bottom ornamentation trim 22 via stopper 23 and then the top edge of sun shade 21 is fastened to the interior surface of top ornamentation trim 22. Mounting of the sun shade is completed by sliding top stopper 25 on the interior surface of ornamentation trim 22 via the pressure of spring 26.

The operational effectiveness of existing fixed-structure sun shade 21 is poor while said sun shade performs incomplete screening of the sunlight and requires a large number of components which lead to additional costs.

SUMMARY OF THE INVENTION

The main object of the present invention is to provide a detachable sun shade which has the ability to completely screen out sunlight.

A further object of the present invention is to provide an inexpensive detachable sun shade with a minimum of component parts.

Still further objects of the present invention include the special features and advantages which are hereinafter described.

BRIEF DESCRIPTION OF THE DRAWINGS

FIG. 1 is a cross sectional diagram.

FIG. 2 is a cross sectional diagram illustrating details of Section A of the invention.

FIG. 3 is a cross sectional diagram describing details of Section B.

FIG. 4 is a perspective view of the stopper configuration shown in FIG. 3.

FIG. 5 is a cross sectional view of existing structures.

FIG. 6 is a cross sectional view detailing Sections A B illustrated in FIG. 5.

DETAILED DESCRIPTION OF THE PREFERRED EMBODIMENTS

The preferred embodiment of the present invention is described herein by means of the figures.

Figure 1:
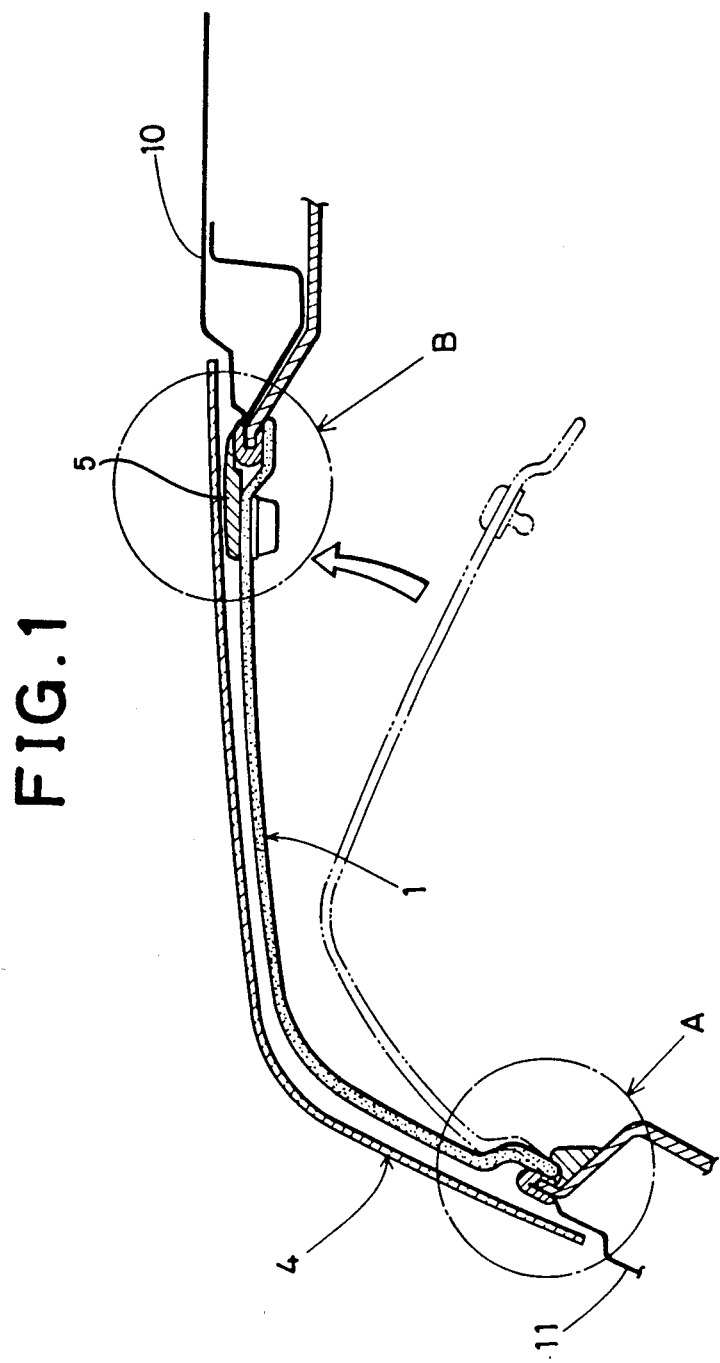
FIGS. 1 through 4 show a single embodiment of the present invention.
Figure 2:
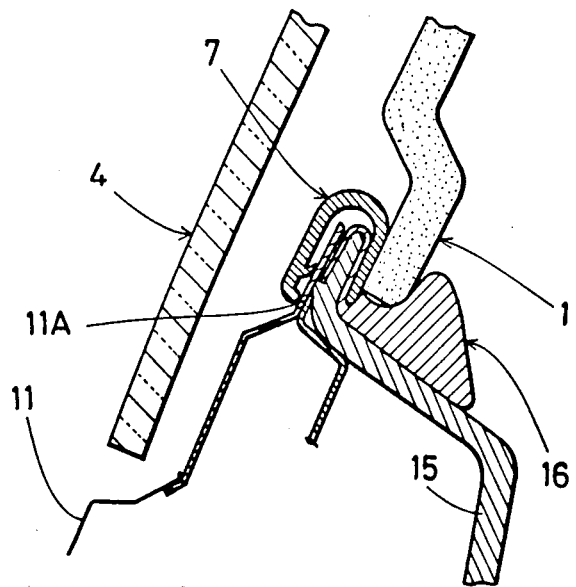
Figure 3:
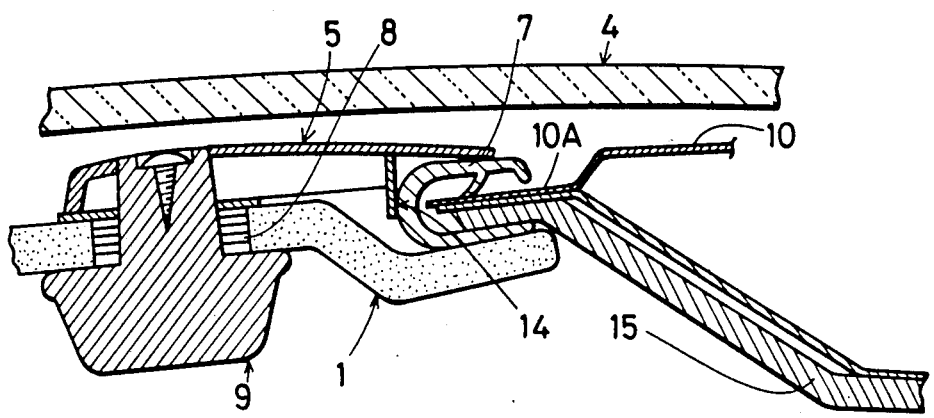
Figure 4:
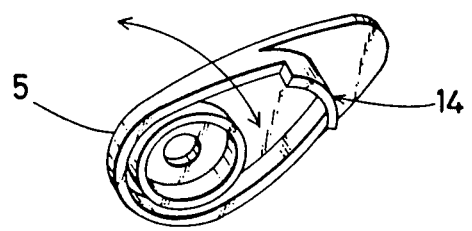

As shown in FIG. 2, opening trim 7 is located at the periphery of ceiling flange 11A of exterior panel 11, in such a way as to hide the juncture of exterior panel 11 and the end edge of molded ceiling material 15, while holder 16 seats a plate clip to ceiling flage 11A and is fixed in position by opening trim 7. As illustrated in FIG. 3, opening trim 7 is also located at the periphery of ceiling flange 10A of the center roof material 10. Base 8 is seated near the top edge of sun shade 1, and stopper 5 is attached to knob 9 by a screw after joining stopper 5 and the top of the shaft of knob 9, which is inserted through a hole located in said base 8. Hook 14 is suspended from near the tip of the stopper 5.

An explanation of the attachment method used to mount sun shade 1 to the ceiling opening is offered herewith in accordance with the aforementioned construction. First, the bottom edge of sun shade 1 is inserted between bottom opening trim 7 and holder 16. After the top edge of sun shade 1 is lifted into position at the bottom surface of opening trim 7, knob 9 is rotated and in turn rotates stopper 5, seating stopper 5 and the top edge of sun shade 1 on opening trim 7 and setting sun shade 1 into position thereby. At this time, hook 14 of stopper 5 is pressure contacted to the interior surface of opening trim 7 and sun shade 1 is pressed to the side of holder 18 via the resulting counteraction, and the entire exterior perimeter of said sun shade 1 adheres to opening trim 7, and completely screens all sunlight. Removal of sun shade 1 is accomplished by following the above operations sequence in reverse order.

In accordance with the aforementioned construction, ornamentation trim becomes unnecessary because top and bottom edges of sun shade 1 come into contact with opening trim 7, which is located around the periphery of the ceiling flange, thus simplifying the fixed-structure of the sun shade.

According to this embodiment of the present invention, a suspended hook 14 is positioned near the leading edge of stopper 5, and when said stopper 5 and the edges of sun shade 1 are set the top edge of opening trim 7, said hook 14 can be pressure contacted to the interior surface of opening trim 7. This embodiment has the advantage of the ability to completely screen sunlight by sun shade 1.

A variation of the aforementioned embodiment includes the attachment of holder 16 to the ceiling flange periphery of the center roof material 10, and the attachment of knob 9 to the bottom edge of sun shade 1.

In line with these embodiments, not only does top and bottom ornamentation trim become unnecessary, but compression springs and the housing for said springs also becomes unnecessary, thus simplifying the fixed-structure of sun shade 1. A reduction in the number of component parts and reduced costs are realized with these advantages, as well as superior operating efficiency.

What is claimed is:

1. A detachable-type vehicle sun shade apparatus for use in vehicles having glass sun roofs installed between a center roof material and an exterior panel both of which define an opening having a flange mounted trim strip therearound, the sun shade apparatus comprising:
    a holder mounted along a first edge of the opening,
    a sun shade having a first edge receivable between said holder and the trim strip along the first edge of the opening, and a second edge,
    a stopper rotatably mounted on said sun shade adjacent said second edge of said sun shade, said stopper including edge engaging means for engaging the trim strip along a second edge of the opening which is adjacent said second edge of said sun shade and knob means for rotating said stopper and bringing said edge engaging means into engagement with the trim strip along the second edge of the opening, said second edge of said sun shade being pressed against the trim strip along the second edge of the opening when the stopper is rotated to a position where the edge engaging means engages the trim strip along the second edge of the opening.

2. The detachable-type vehicle sun shade apparatus according to claim 1, wherein said edge engaging means includes a hook which is rotatable with the stopper to a position against the trim strip along the second edge of the opening.

3. The detachable-type vehicle sun shade apparatus according to claim 2, wherein said hook presses against the trim strip along the second edge of the opening when the second edge of said sun shade is seated against the second edge of the opening.

4. A vehicle having a detachable-type vehicle sun shade comprising a ceiling opening defined by a ceiling flange formed from a center roof material and an exterior panel, an opening trim strip enclosing a periphery of the ceiling flange, a glass sun roof provided exteriorly of theim ceiling flange, a holder fixedly secured to said opening trim strip, a sun shade to cover said ceiling opening, a stopper rotatably provided on said sun shade and having a knob and a hook secured thereto, wherein said sun shade is attached to an edge of said opening trim strip adjacent said holder by one edge of said sun shade being inserted between said opening trim strip and said holder, said stopper being rotatable to a position in which said opening trim strip is held between said sun shade and said stopper, said hook holding said sun shade within said holder as a result of pressure of said hook against said opening trim strip.

* * * * *